United States Patent [19]
Williams et al.

[11] Patent Number: 5,511,286
[45] Date of Patent: Apr. 30, 1996

[54] HANDLE WITH MODULAR HUB

[75] Inventors: Michael R. Williams, Houston; Richard D. Van Orsdale, The Woodlands; Orlando A. Mejia, Houston; Don B. Wafer, Spring, all of Tex.

[73] Assignee: FMC Corporation, Chicago, Ill.

[21] Appl. No.: 133,689

[22] Filed: Oct. 7, 1993

Related U.S. Application Data

[63] Continuation-in-part of Ser. No. 968,615, Oct. 29, 1992, Pat. No. 5,404,615.
[51] Int. Cl.⁶ ....................................... E05B 1/00
[52] U.S. Cl. ................ 16/114 R; 81/121.1; 81/124.7
[58] Field of Search ................... 16/114 R, 110 R, 16/DIG. 24, DIG. 30, DIG. 40, DIG. 41; 81/3.4, 121.1, 124.4, 124.7, 177.5; 251/93; 74/558, 558.5, 528, 557, 551.1, 553

[56] References Cited

U.S. PATENT DOCUMENTS

| 88,017 | 3/1869 | Dexter | 81/177.5 |
|---|---|---|---|
| 2,142,589 | 1/1939 | Olson | 81/177.2 |
| 3,835,736 | 9/1974 | Campbell, Jr. et al. | 251/93 |
| 4,515,037 | 5/1985 | Block | 74/553 |
| 4,844,115 | 7/1989 | Bowers | 251/93 |
| 4,999,875 | 3/1991 | Rybak | 16/116 R |

FOREIGN PATENT DOCUMENTS 017992 of 1910 United Kingdom ................... 81/124.7

Primary Examiner—P. Austin Bradley
Assistant Examiner—Chuck Y. Mah
Attorney, Agent, or Firm—Henry C. Query, Jr.

[57] ABSTRACT

A handle for imparting rotational motion to a rotationally-operable device including a valve stem and shear pin assembly, the handle comprising an elongated arm having a hub section for receiving a modular hub, a hand grip attached to one end of the arm, and yoke means attached to the distal end of the arm, the modular hub having protrusions for linking the modular hub to the hub section to provide for the transfer of torque between the handle and the modular hub and internal voids for engageably receiving the valve stem and shear pin assembly.

3 Claims, 6 Drawing Sheets

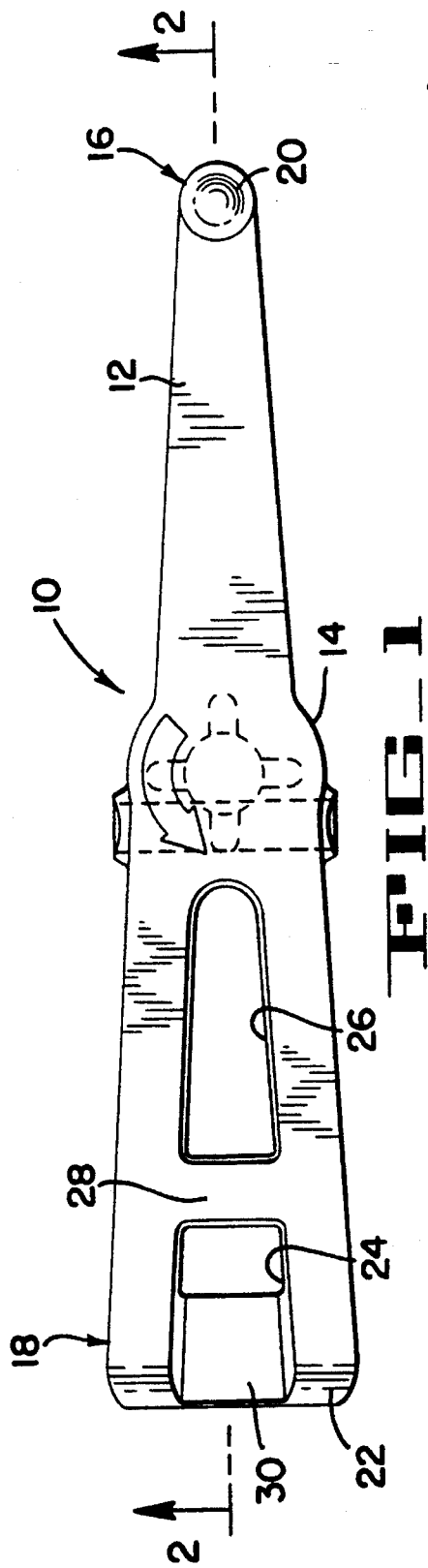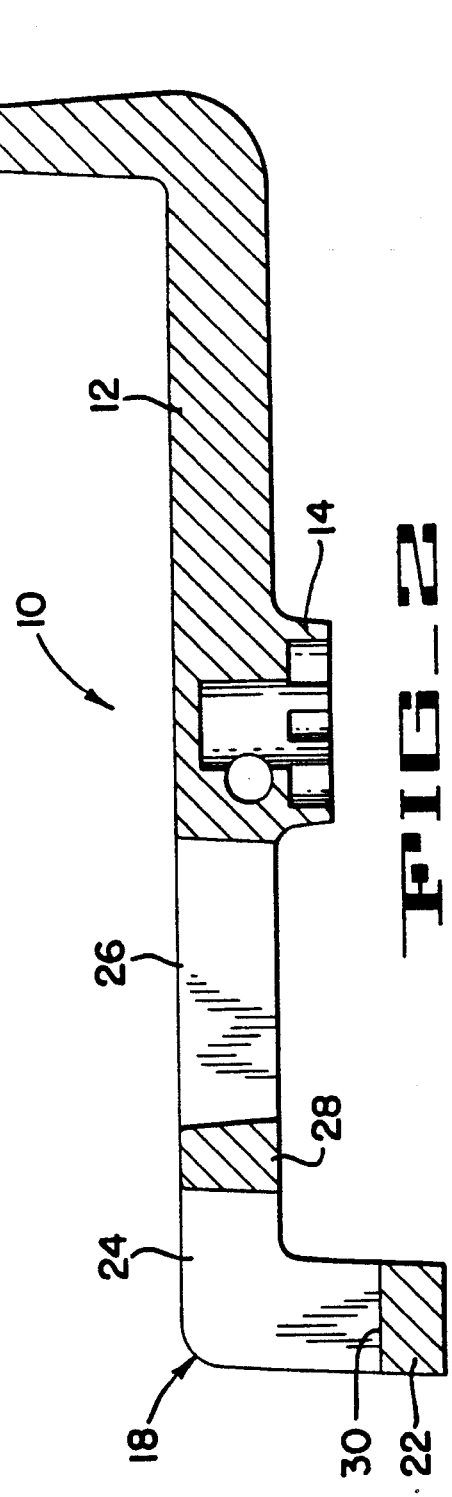

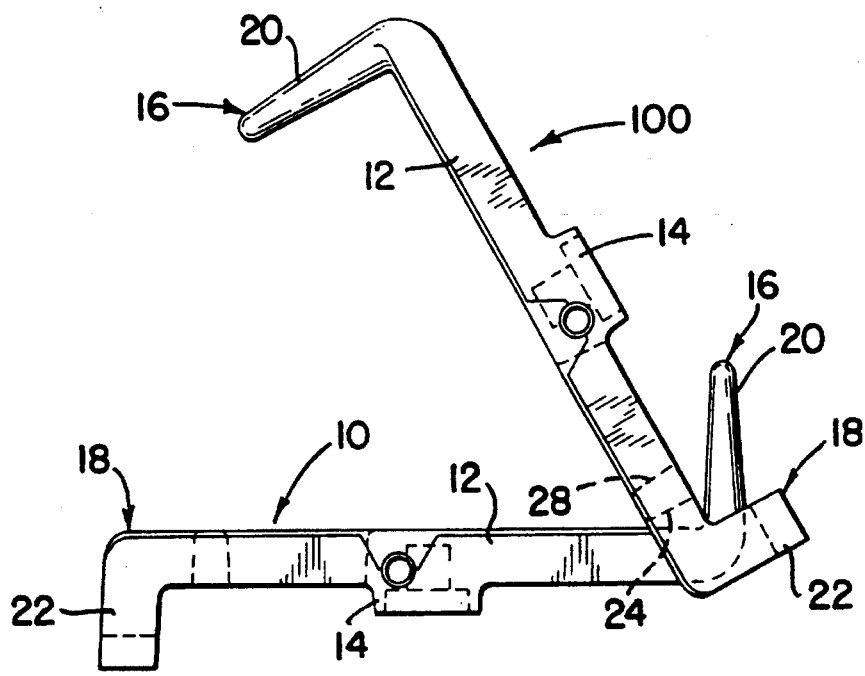
FIG_3
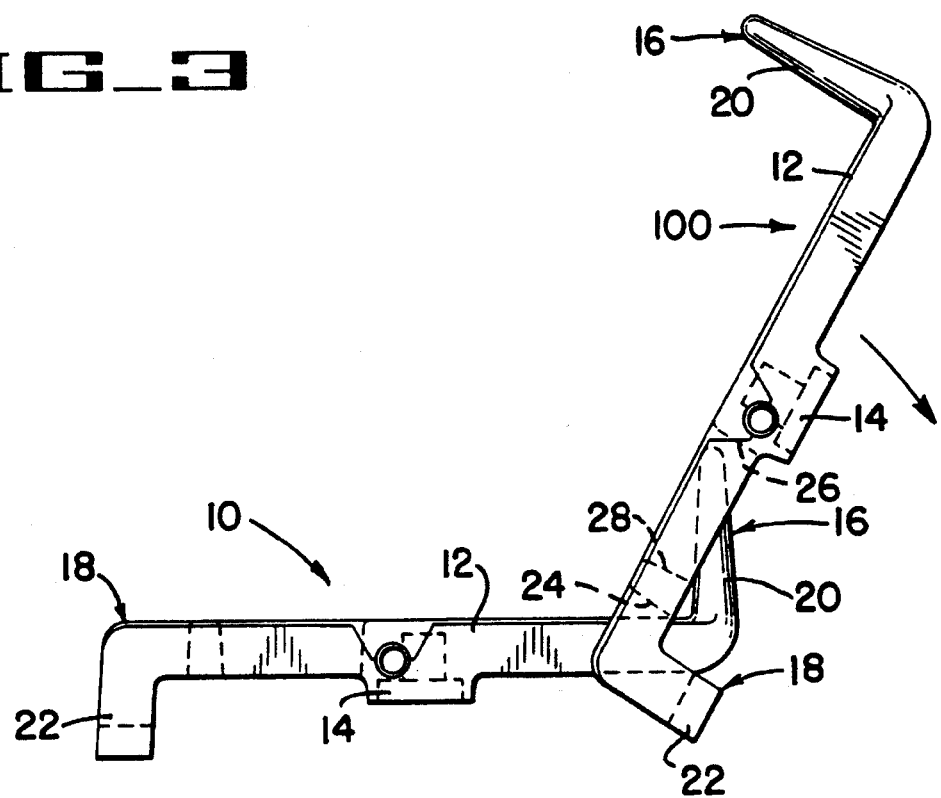
FIG_4

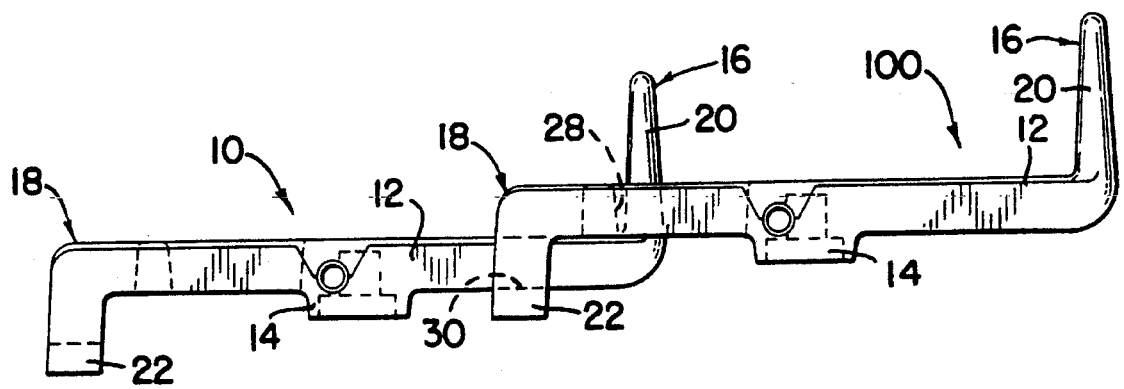
FIG_5
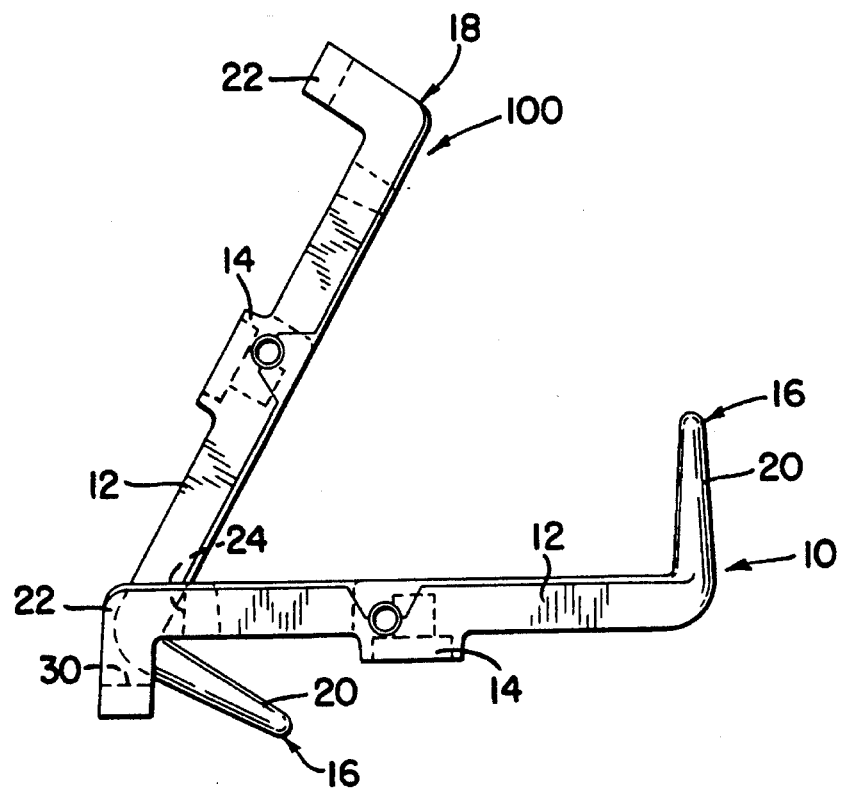
FIG_6

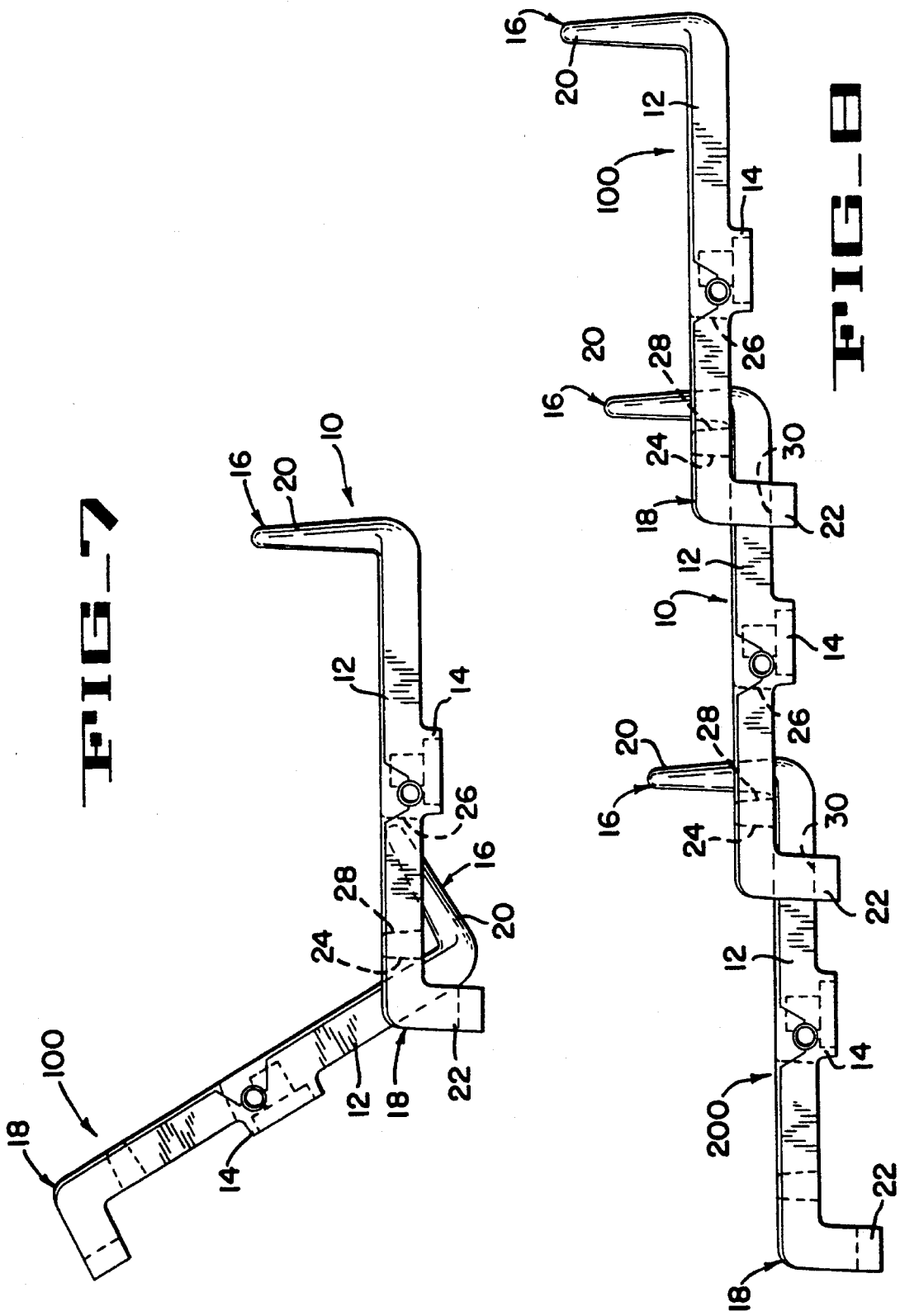

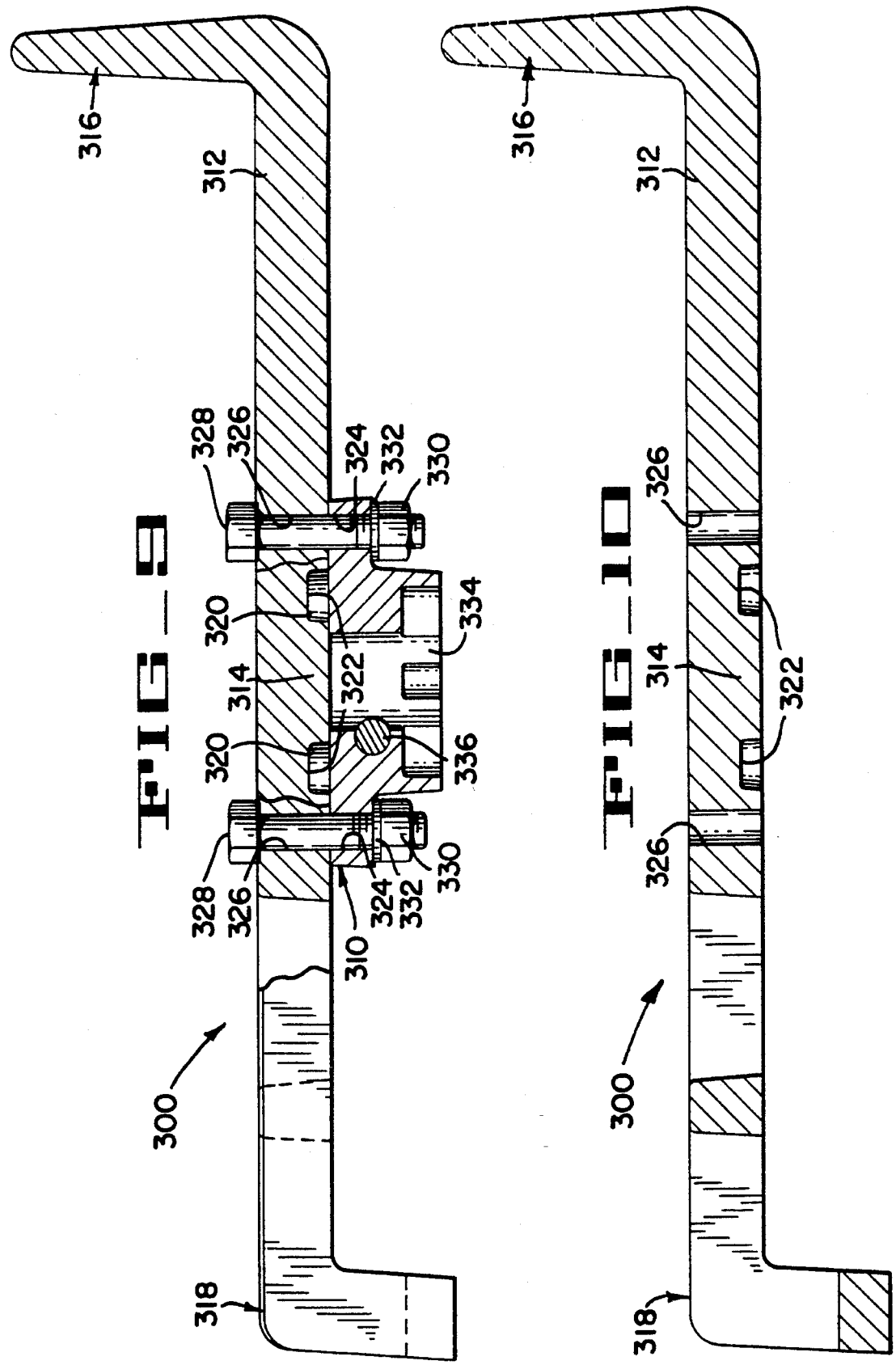

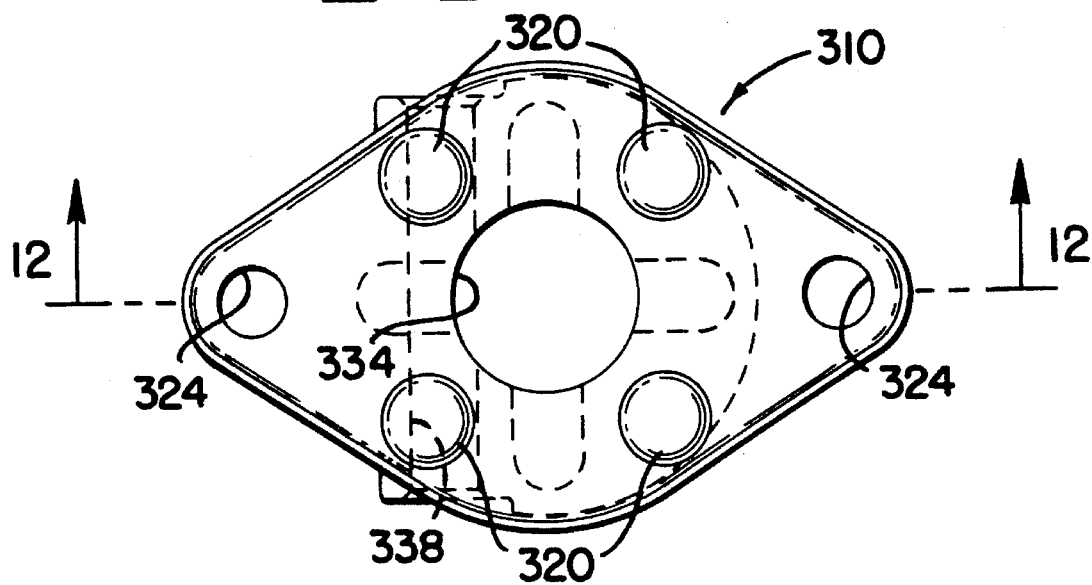
FIG_11
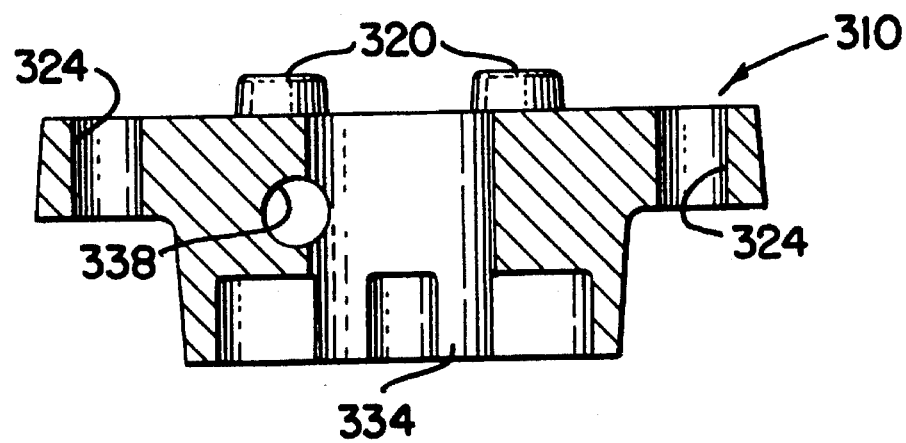
FIG_12

HANDLE WITH MODULAR HUB

This application is a continuation-in-part of applicants' co-pending application Ser. No. 07/968,615 filed on Oct. 29, 1992, now U.S. Pat. No. 5,404,615.

FIELD OF THE INVENTION

This invention relates to handles used to impart rotational motion to rotationally-operable devices. More particularly, the invention relates to handles used to open and close manually-operable valves.

BACKGROUND OF THE INVENTION

An example of a rotationally-operable device in connection with which a handle is used to impart the rotational motion is a gate valve, such as is used in a wellhead. Typically, the type of handle used to open and close a gate valve is a handwheel. The size of the handwheel is usually dictated by the diameter of the flange of the gate valve; and since flange dimensions are established by an independent organization responsible for standardizing wellhead equipment, the size of the handwheel is normally limited and unchangeable. While under normal conditions the handwheel may be sufficient to open and close the gate valve, many times the valve will become stuck, thus requiring additional torque to open or close the valve. In these instances, the standard handwheel may not provide a moment arm long enough to allow the operator to generate the additional torque without the assistance of special tools.

SUMMARY OF THE INVENTION

Therefore, it is an object of the present invention to provide a handle which can be used to impart rotational motion to rotationally-operable devices. Another object of the invention is to provide such a handle which can be used in applications, such as wellhead gate valves, in which the size of the handle is limited by industry standards or practical considerations. A further object of the invention is to provide a handle which has a rugged construction but can also be adapted to effectively increase the moment arm of the handle in order to generate additional torque, when required.

According to the present invention, these and other objects and advantages are achieved by providing a handle comprised of an elongated arm section having a centrally located hub section adapted to be detachably connected to the valve stem and shear pin assembly of a valve, an operative end to which the manual force is applied, and a conjunctive end which, when the handle is used with a second such handle, is designed to be coupleable with the operative end. The operative end comprises a hand grip, which in the preferred embodiment extends perpendicularly upwardly from the arm. The conjunctive end comprises a yoke, an opening adjacent the yoke, a slot extending longitudinally from the hub section and a brace member located between the opening and the slot. The length of the handle is selected to allow it to be used in applications where size is limited by industry standards or practical considerations. Furthermore, the handle is constructed of a strong, durable material, such as steel, and it is portable and easily transferable from valve to valve due to the detachable connection of the hub section to the valve stem.

In many applications, multiple valves are located in close proximity to each other. The fewest number of valves on a wellhead is normally two. Thus, if one or more of the valves becomes stuck or otherwise requires more torque be applied than is possible to generate with a single handle, two handles can be advantageously connected in order to create a longer moment arm, or effectively increase the moment arm of the first handle which is connected to the valve stem. This eliminates the need for special tools or torque multipliers.

The handles of the present invention are connected by coupling the conjunctive end of a second handle with the operative end of the first handle, or vice-verse. More specifically, the opening of the second handle is placed over the hand grip of the first handle, and the second handle is rotated in a plane defined by the arm and grip of the first handle until the top of the grip projects though the slot of the second handle. The second handle is then rotated further until the bottom of the brace member of the second handle engages the top of the arm of the first handle. In this position, the portion of the arm of the first handle adjacent the grip is trapped within the yoke and between the top of the bottom portion of the yoke and the underside of the brace member of the second handle. In addition, rotational motion of the second handle with respect to the first handle in a plane transverse to the valve stem is prevented by the engagement of the grip and arm of the first handle within the slot and yoke, respectively, of the second handle. The moment arm applied to the valve stem is therefore lengthened. Thus, applying a force to the grip of the second handle results in a greater torque being generated at the valve stem than is possible by applying the same force to the grip of the first handle.

An additional advantage of the present invention is that, due to the advantageous design of the operative and conjunctive ends, any size handle of the present invention can be interlocked with any other size such handle.

In another embodiment of the invention, the handle described above is adapted to be connected to any of a plurality of modular hubs, each of which is designed to connect with one of several different stem and shear pin sizes and configurations existing on various hand operated gate valves. According to this embodiment of the present invention, each modular hub comprises internal voids corresponding to the size and configuration of a gate valve stem and shear pin over which it is to be fit. The modular hub also comprises preferably two holes for mounting to a handle and preferably four symmetrically located protrusions. The handle in this embodiment of the invention comprises a hub section having four symmetrical recesses corresponding to the protrusions and two holes through which, for examples, bolts extend to removably connect the modular hub to the handle. Thus, by combining the handle with one of any number of modular hubs, the handle can be used in connection with any number of gate valves having different stem and shear pin sizes and configurations. In another embodiment of the invention, a standard handwheel can be adapted to be connected to the modular hubs so that the handwheel can be used with any number of gate valves having different stem and shear pin sizes and configurations.

These and other objects and advantages of the present invention will be made apparent from the following detailed description, with reference to the accompanying drawings.

BRIEF DESCRIPTION OF THE DRAWINGS

FIG. 1 is a top plan view of the handle of the present invention;

FIG. 2 is a cross-sectional view of the handle of the present invention taken along line A—A of FIG. 1;

FIG. 3 is a front elevation view of two handles of the present invention in the initial stage of coupling;

FIG. 4 is a front elevation view of the handles of FIG. 3 in an intermediate stage of coupling;

FIG. 5 is a front elevation view of the handles of FIG. 4 fully coupled;

FIG. 6 is a front elevation view of two handles of the present invention in the initial stage of coupling in another manner;

FIG. 7 is a front elevation view of the handles of FIG. 6 in an intermediate stage of coupling;

FIG. 8 is front elevation view of three handles of the present invention fully coupled;

FIG. 9 is a front elevation view of another embodiment of the handle of the present invention combined with the modular hub component of the present invention;

FIG. 10 is a cross-sectional view of the handle depicted in FIG. 9, the modular hub component being eliminated from this figure for purposes of clarity;

FIG. 11 is a top plan view of the modular hub component of the present invention; and FIG. 12 is a cross-sectional view of the modular hub taken along line B—B of FIG. 11.

DETAILED DESCRIPTION OF THE PREFERRED EMBODIMENT

Referring to FIGS. 1 and 2, the handle of the present invention, indicated generally by reference numeral 10, comprises an elongated arm 12 having a centrally located hub section 14 which is adapted to be detachably connected with the valve stem and shear pin assembly of a valve (not shown), as is well known in the art. Arm 12 further comprises an operative end 16 and a conjunctive end 18, which, when handle 10 is used in combination with a second such handle, is designed to be coupleable with end 16 to effectively increase the moment arm of handle 10, as will be described.

More specifically, operative end 16 comprises a hand grip 20 which preferably extends perpendicularly upwardly from arm 12. Conjunctive end 18 comprises a U-shaped yoke 22 extending perpendicularly downwardly from arm 12, an opening 24 adjacent yoke 22, an elongated slot 26 extending longitudinally from adjacent hub section 14 toward opening 24, and a brace member 28 located between opening 24 and slot 26. The vertical distance between the top 30 of the bottom portion of yoke 22 and the underside of brace member 28 generally corresponds to the thickness of the portion of arm 12 between grip 20 and hub section 14.

Handle 10 is preferably constructed of a strong, durable material, such as steel, and grip 20, yoke 22 and brace 28 may be either manufactured together with arm 12 in a single casting operation or manufactured separately and attached to arm 12 by any appropriate means.

In operation, handle 10 is removably connected via hub section 14 to the valve stem of a valve (not shown) to provide a convenient means for manually opening and closing the valve. When a valve requires more torque be applied to open or close it, additional such handles can be coupled with handle 10 to effectively increase the moment arm of handle 10 and thereby enable additional torque to be generated while reducing the amount of force a person would otherwise be required to exert to open or close the valve. To simplify this description, a second and third such handles will be referred to and indicated in the drawings by reference numerals 100 and 200. It is to be understood that handles 100 and 200 are identical to handle 10, and therefore the same reference numerals will be used to describe elements identical to those previously described for handle 10. Handles 100 and 200 may be of different lengths than handle 10; however, a feature of the present invention is that handles of different sizes may be combined as hereinafter described to achieve the desirous effects of the present invention.

The coupling of handles 10 and 100 is best described by reference to FIGS. 3 through 5. Referring to FIG. 3, handles 10 and 100 are coupled by initially placing the conjunctive end of handle 100 over the operative end of handle 10 so that grip 20 of handle 10 extends through opening 24 of handle 100. Handle 100 is then rotated, clockwise as viewed in FIG. 4, until grip 20 of handle 10 projects through slot 26 of handle 100, as shown in FIG. 4. Handle 100 is then rotated further until the underside of brace 28 of handle 100 engages the top of arm 12 of handle 10, as shown in FIG. 5. In this position, the portion of arm 12 of handle 10 between hub section 14 and grip 20 is captured firmly within yoke 22 of handle 100 and between the underside of brace 28 and the top 30 of yoke 22 of handle 100. Handle 100 may also be coupled with handle 10 as shown in FIGS. 6 and 7, wherein grip 20 of handle 100 is inserted through opening 24 of handle 10 and handle 100 is rotated, counterclockwise as viewed in FIGS. 6 and 7, until the top of arm 12 of handle 100 engages the underside of brace 28 of handle 10. Relative movement of handle 100 with respect to handle 10 is prevented by the engagement of arm 12 and grip 20 of handle 10 within yoke 22 and slot 26, respectively, of handle 100. Applying a force to hand grip 20 of handle 100 (for the engagement illustrated in FIGS. 3 and 4), or to conjunctive end 18 of handle 100 (for the engagement illustrated in FIGS. 6 and 7), results in a greater torque being applied to the valve stem connected to hub section 14 of handle 10 than would be generated by applying the same force to grip 20 of handle 10.

It should be understood from the above description that additional handles may be combined with handle 10 to more easily generate the additional torque that may be required to open or close a particular valve. For example, FIG. 8 illustrates two additional handles, handles 100 and 200, in combination with handle 10, which would be connected to the valve stem of a valve (not shown). Handles 100 and 200 are coupled with handle 10 in a manner described above to effectively increase the moment arm of handle 10.

In another embodiment of the invention, depicted in FIGS. 9 through 12, a handle 300 is coupled to a modular hub 310 to increase the ability of handle 300 to connect to any of a number of gate valves having different sizes and configurations of stem and shear pin assemblies. Referring to FIGS. 9 and 10, handle 300 is recognized as being similar to handle 10 in that it comprises an elongated arm 312 having a centrally located hub section 314, an operative end 316 and a conjunctive end 318. Operative end 316 and conjunctive end 318 are identical to operative end 16 and conjunctive end 18 described in reference to the previous embodiments. In this embodiment, however, hub section 314 is adapted to be mounted to modular hub 310, as will be described. In all other respects, handle 300 operates in the same manner as handle 10.

Referring to FIGS. 9, 11 and 12, modular hub 310 is preferably constructed of a single piece of cast or machined metal and comprises means for linking modular hub 310 with handle 300 to provide for the transfer of torque from handle 300 to modular hub 310. In the preferred embodiment, this means includes four symmetrically located protrusions 320 extending from the relative top of modular hub 310. Protrusions 320 mate with four annular recesses 322 in hub section 314 (only two of which are visible in FIGS. 9 and 10) to transfer the torque from handle 300 to modular hub 310. Modular hub 310 also preferably comprises two holes 324, which align with holes 326 in hub section 314 when protrusions 320 are received within recesses 322. Bolts 328 extend through holes 324 and 326 and are secured by nuts 330 and preferably lock washers 332 (FIG. 9) to removably connect modular hub 310 to handle 300. Of course, bolts 328 extending through holes 324 and 326 can be used as means for linking modular hub 310 with handle 300 to provide for the transfer of torque between these two elements in the absence of or in addition to protrusions 320.

Referring to FIGS. 11 and 12, modular hub 310 also includes internal voids, generally 334, which engageably receive any one of a number of different stem and shear pin sizes and configurations, these sizes and configurations being known to those skilled in the art. Modular hub 310 also preferably includes a removable pin 336 (FIG. 9) for coupling modular hub 310 to the valve stem. In this regard, modular hub 310 also includes an annular opening 338 (FIG. 12) for pin 336 which is aligned with a groove on the valve stem (not shown) so that insertion of pin 336 into opening 338 will secure modular hub 310 to the valve stem.

Any of a number of modular hubs 310 may be provided, each with different internal voids 334 corresponding to different stem and shear pin assemblies. Thus, by connecting the appropriate modular hub 310 to handle 300, handle 300 can be used on any number of gate valves. This eliminates the need for providing different handles for different gate valves. Modular hub 310 can also be used on any conventional handwheel having a flat, diametrical cross-piece, provided the handwheel is provided with means for linking the handwheel to modular hub 310. One manner of providing such means would be to drill recesses 320 and holes 322, described above, into the cross-piece.

It should be recognized that, while the present invention has been described by reference to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. An apparatus for imparting rotational motion to a rotationally-operable device having a valve stem and shear pin assembly, the apparatus comprising:

a handle including an elongated arm, a hand grip attached to one end of the arm, yoke means attached to the distal end of the arm for engaging a hand grip of a second such handle and a hub section located between the hand grip and the yoke means;

a modular hub means for connecting the handle to the rotationally-operable device;

the hub means having internal voids adapted to engageably receive any one of a number of different valve stem and shear pin sizes and configurations;

means for linking the hub means to the hub section to provide for the transfer of torque between the hub means and the handle; and means for removably securing the hub means to the hub section;

whereby different hub means having different internal voids may be used to connect the handle to different valve stem and shear pin assemblies.

2. The apparatus of claim 1, wherein the linking means comprises at least one protrusion extending from the hub means and at least one corresponding recess in the hub section in which the protrusion is positioned when the hub means is secured to the hub section.

3. The apparatus of claim 1, wherein the securing means comprises at least one bolt extending through corresponding aligned holes in the hub means and the hub section.

* * * * *